United States Patent [19]
Hart

[11] 3,859,142
[45] Jan. 7, 1975

[54] ENCLOSED ELECTRICAL ENERGY STORAGE DEVICE WITH HALOGEN ABSORBING MEANS

[75] Inventor: Thomas Gordon Hart, Royal Oak, Mich.

[73] Assignee: Occidental Energy Development Company, Madison Heights, Mich.

[22] Filed: Mar. 20, 1972

[21] Appl. No.: 236,009

[52] U.S. Cl. .................. 136/179, 136/6 R, 136/166
[51] Int. Cl. .......................................... H01m 1/06
[58] Field of Search ......... 136/6, 83, 100, 179, 177, 136/180, 166, 167, 163; 206/.6, .7; 161/404, 405

[56] References Cited
UNITED STATES PATENTS

| | | | |
|---|---|---|---|
| 2,356,334 | 8/1944 | Maude et al. | 206/0.7 |
| 3,122,284 | 2/1964 | Miles | 206/0.7 |
| 3,179,553 | 4/1965 | Franklin | 161/404 |
| 3,391,752 | 7/1968 | Albright | 136/6 R |
| 3,451,850 | 6/1969 | Du Plessix | 136/6 R |
| 3,640,770 | 2/1972 | Zito, Jr. | 136/6 L |
| 3,682,703 | 8/1972 | Smith | 136/6 S |
| 3,698,587 | 10/1972 | Baker et al. | 161/404 |

*Primary Examiner*—Winston A. Douglas
*Assistant Examiner*—C. F. LeFevour
*Attorney, Agent, or Firm*—B. F. Claeboe

[57] ABSTRACT

An enclosed electrical energy storage device comprising;
1. a battery compartment means having halogen therein;
2. a halogen absorbing layer means surrounding the battery compartment means;
3. a resealable layer means surrounding the halogen absorbing layer means; and
4. an impact resistant layer means surrounding the resealable layer means.

7 Claims, 3 Drawing Figures

PATENTED JAN 7 1975

3,859,142

ENCLOSED ELECTRICAL ENERGY STORAGE DEVICE WITH HALOGEN ABSORBING MEANS

BACKGROUND OF THE INVENTION

Due to the increase interest in electric vehicles, high energy density batteries are becoming more and more prevalent. One chemical element which is a likely candidate for an oxidant in a high energy density battery is halogen. One of the difficulties associated with the utilization of the halogen is that it is an odoriferous gas which can be detected at very low concentrations in the atmosphere. It is therefore necessary that some means for handling halogen in such high energy density batteries must be devised in order to utilize them in a convenient manner.

A recent innovation in an electrical energy storage device is that described in U.S. Application Ser. No. 50,054, filed June 26, 1970 now U.S. Pat. No. 3,713,888 which is hereby incorporated by reference wherein halogen hydrate is used as the means of storing the halogen oxidant. It has been estimated that at the time of the initiation of discharge, approximately 99% of the halogen of the halogen hydrate battery is present as a solid halogen hydrate with only about 1% of halogen, such as chlorine circulating in the electrolyte solution either as a gas or dissolved in the solution. Because of ths type of battery, the requirements for containing and controlling a leaking halogen oxidant are greatly diminished for much of the halogen is present as a solid which can be readily handled and which slowly decomposes.

Various electric vehicles have been described where a battery has been included in the overall design of the car such as that described in U.S. Pat. Nos. 3,477,538 and 3,493,068.

SUMMARY OF THE INVENTION

Applicant's invention is directed to an enclosed electrical energy storage device which is comprised of a battery compartment means, having a halogen therein, a halogen absorbing layer means surrounding the battery compartment means; a resealable layer means surrounding the halogen absorbing layer means an impact resistant layer means surrounding the resealable layer means.

DESCRIPTION OF PREFERRED EMBODIMENTS

The invention is related to the utilization of an enclosed electrical energy storage device whereby a battery can be protected against ruptures resulting from any impact which may break open the battery such as that occurring in an auto crash. The battery can be any halogen containing battery such as a halogen hydrate battery described in U.S. Application Ser. No. 50,054 mentioned above or other halogen containing devices.

Figure 1:
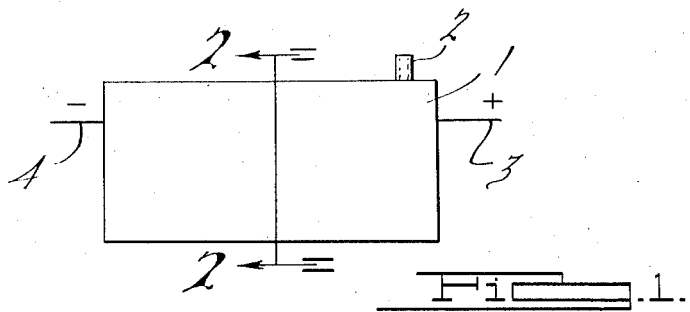
FIG. 1 is a schematic diagram of the enclosed electrical energy storage device of the invention.

Referring now to the drawings, FIG. 1 shows an overall view of the enclosed electrical energy storage device 1 of the present invention having positive 3 and negative 4 leads. Venting means 2 is also included.

Figure 2:
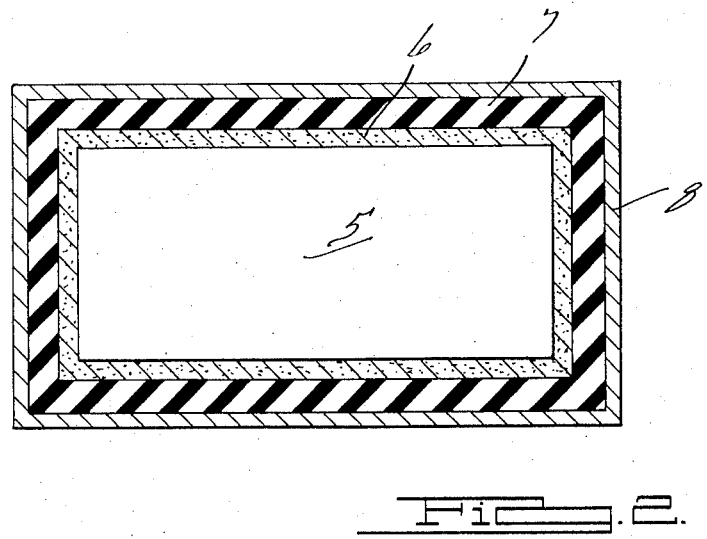
FIG. 2 is a sectional view of FIG. 1 taken along lines 2—2.

FIG. 2 shows the inside of the device of the present invention when viewed along lines 2—2 of FIG. 1.

The enclosed electrical energy storage device is comprised of:

1. a battery compartment means 5 having a halogen therein:
2. a halogen absorbing layer means 6 surrounding the battery compartment means;
3. a resealable layer means 7 surrounding the halogen absorbing layer means; and
4. an impact resistant layer means 8 surrounding the resealable layer means.

The halogen that may be used may be fluorine, chlorine or bromine, with chlorine and bromine being preferred while chlorine is the most preferred. for simplification chlorine will be mentioned subsequently although other halogens may also be used.

The halogen absorbing layer means that may be employed in the present invention is any chemical or material which will neutralize or react with the halogen which may escape from the battery compartment means. The halogen absorbing layer means may take the form of a thin aluminum foil or some halogen absorbing powder such as that containing powdered aluminum or zinc or aluminum sponge. These metallic powders may be included in a light weight inert filler such as clay, etc. The halogen absorbing layer means should be any material that is low in volume and low in weight and sufficient to absorb or neutralize the halogen which may escape from the battery compartment means. Another means that may be used as the halogen absorbing means would be pumice soaked with caustic such as sodium or potassium hydroxide.

The resealable layer means surrounding the halogen absorbing means would be used to reseal any puncture that may be made in the device of this invention. The resealable layer means can be any material that will retain its tack when punctured. Normally, materials that may be employed here are rubbers that have been incompletely cured such as butyl rubber, silicone rubber, and the like.

The impact resistant layer means which is the final layer surrounding all of the above layers, is any material which is capable of withstanding shock such as that which occurs in an automobile crash or in dropping the enclosed device of the present invention. The purpose of the impact resistant layer is to permit some deformation of the device of this invention without permitting the battery compartment contents from being exposed to the atmosphere.

It is to be appreciated, however, that due to materials limitations a completely crash proof system can not be desired. Suffice it to say that the device of the present invention should be capable of withstanding a shock energy level of up to 7,500 ft:lbs. or that resulting from an auto crash of up to about 35 m.p.h. with the device installed in the car as shown in FIG. 3.

Normally, the impact resistant layer means may be comprised of steel, titanium or any deformable material such as high molecular weight polyethylene, LEXAN (mark of General Electric for thermoplastic polycarbonate resin) and the like.

Figure 3:
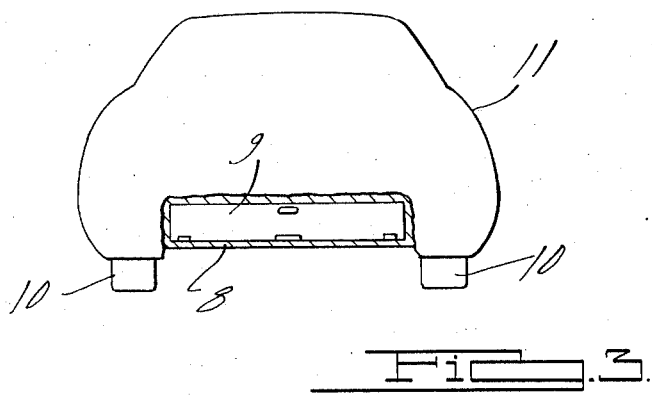
FIG. 3 is one means of employing the enclosed electrical energy storage device in an automobile.

It has been desirably found that the final layer, the impact resistant layer means may take the form of being the strength member or chassis of an automobile as is described in FIG. 3. By "strength member" is meant that portion of an auto which is the main portion, framework or superstructure of a car thereby giving the car its strength or support. FIG. 3 shows an automobile 11 with wheels 10 wherein the strength member of the car is the impact resistant layer 8 of applicant's enclosed electrical energy storage device. In order to readily check or remove the battery compartment means and its surrounding layers, the car described in FIG. 3 will have a door 9 which may be opened downward as desired.

It is to be understood that varying layers other than those mentioned above may also be inserted as desired so as to retain the halogen inside the battery compartment means and at the same time to give additional impact resistance to the enclosed electrical energy storage device without significantly adding to the weight so that the battery may retain its character as a high energy density battery. Such layers may be inserted between the battery compartment means and the halogen absorbing means. these additional layers will normally be a plastic which is resistant to halogen or the aqueous metal halide electrolyte inside the battery compartment means. This plastic may also surround the halogen abosrobing layer means. this halogen resistant and electrolyte resistant plastic layer may likewise be inserted between the resealable layer means and the impact resistant layer means.

The advantages of the enclosed electrical energy storage device is that a battery will be completely sealed within an impact resistant, environment resistant; battery oxidant and an electrolyte resistant material so that upon crash of the automobile containing the high energy density battery the battery contents will not be exposed to the atmosphere. However, it may be necessary to have a venting means 2 for emergency situations. Such situations could arise wherein the battery would be in a high temperature environment such as intense fire whereby the contents in the battery compartment means would increase in temperature and pressure. The venting means would then be a pressure sensitive venting means and may be comprised of titanium which will be designed to break or vent at a pressure from about 200 to 400 p.s.i.

The venting means could also be designed to vent the battery compartment at any time by adjusting the pressure sensitive device. It is preferred, however, that the enclosed device of the present invention have no venting means thereby simplifying construction.

What is claimed is:

1. An enclosed halogen containing electric energy storage device capable of withstanding ruptures and preventing the release of halogen, having a halogen containing battery and an impact resistant layer means surrounding said halogen containing battery, the improvement comprising a metal containing halogen absorbing layer means surrounding the halogen battery, said abosrobing means being capable of absorbing halogen released from the battery and a resealable layer means positioned within the impact resistant layer means and surrounding the halogen abosrobing layer means and being capable of resealing after puncture, whereby the metal from the halogen absorbing layer means will react with the halogen which may escape from the halogen containing battery.

2. The device of claim 1 further comprising halogen resistant sealing means between any of the layer means.

3. The device of claim 2 further comprising halogen resistant sealing means between the battery and the halogen absorbing layer means.

4. The device of claim 1 further comprising venting means to vent the halogen present in the battery.

5. The device of claim 1 wherein the metal is selected from the group consisting of aluminum and zinc.

6. The device of claim 5, wherein the metal is a metallic powder.

7. The device of claim 1, wherein the metal containing halogen absorbing layer means is caustic.

* * * * *